United States Patent
Travers et al.

(10) Patent No.: US 6,417,970 B1
(45) Date of Patent: Jul. 9, 2002

(54) TWO STAGE OPTICAL SYSTEM FOR HEAD MOUNTED DISPLAY

(75) Inventors: Paul Travers, Honeoya Falls; Paul Chumetski, West Henrietta, both of NY (US)

(73) Assignee: Interactive Imaging Systems, Rochester, NY (US)

( * ) Notice: Subject to any disclaimer, the term of this patent is extended or adjusted under 35 U.S.C. 154(b) by 0 days.

(21) Appl. No.: 09/589,836
(22) Filed: Jun. 8, 2000
(51) Int. Cl.⁷ .............................................. G02B 27/14
(52) U.S. Cl. ...................................... 359/630; 359/631
(58) Field of Search ................................. 359/630, 631, 359/633, 637; 345/7–9

(56) References Cited

U.S. PATENT DOCUMENTS

| | | | |
|---|---|---|---|
| 3,941,467 A | * 3/1976 | Kapany et al. | 353/34 |
| 5,771,124 A | 6/1998 | Kintz et al. | 359/633 |
| 5,795,049 A | 8/1998 | Gleckman | 353/122 |
| 5,959,780 A | 9/1999 | Togino et al. | 359/630 |
| 5,991,084 A | 11/1999 | Hildebrand et al. | 359/629 |
| 6,005,720 A | 12/1999 | Watters et al. | 359/633 |
| 6,023,372 A | 2/2000 | Spitzer et al. | 359/630 |

\* cited by examiner

*Primary Examiner*—Ricky Mack
(74) *Attorney, Agent, or Firm*—Stephen B. Salai, Esq.; Brian B. Shaw, Esq.; Harter, Secrest & Emery LLP

(57) ABSTRACT

A head-mounted display having a two-stage optical process is disclosed. This two-stage system enables a relatively compact and inexpensive head mounted display. The head-mounted display has two sections extending rearward around the sides of the head. Within each section, a display screen projects an image that passes through a first lens. It then undergoes a magnification process involving total internal reflection within a second lens. The light exiting the second lens is magnified to the level desired at a low cost and a small size.

15 Claims, 7 Drawing Sheets

TWO STAGE OPTICAL SYSTEM FOR HEAD MOUNTED DISPLAY

FIELD OF THE INVENTION

The present invention relates to an optical display for head mounted displays, and more particularly, to a two-stage optical system for this display that comprises a first stage for magnification and image sizing and a second stage that includes a total internal reflection process.

BACKGROUND OF THE INVENTION

While the software and computer hardware for creating virtual reality has continued to improve, there still exists a need for physically presenting a visual display and audio signals to the user. Such a device is shown in U.S. Pat. No. 4,952,024 which disclosures center rib head mounted display. Alternative, devices have employed a helmet that includes a mounted visor that reflects projected light to present a virtual display to the wearer.

Generating sizable displays (displays that measure upwards of 2 inches diagonally) is expensive and greatly increases the cost of a head mounted display. Head mounted displays necessarily present the viewer with virtual images. In order to provide a viewer with as complete a virtual reality experience as possible, the image he sees should fill his field of vision. The viewer must also be able to look around at his environment. In order to accomplish these goals, a head-mounted display needs to provide a virtual image to the viewer as opposed to a real image.

A real image refers to an image that is observed directly by the unaided human eye. A photograph is an example of a real image. Electronic displays that provide a real image generally provide some form of display surface on which the real image is formed and viewed. A real image can be observed by the unaided eye when a viewing surface is positioned at its location. Examples of electronic displays that provide real images include liquid crystal displays, CRT monitors, and projection screens.

By contrast to a real image, a virtual image is an image which, if a viewing surface were positioned at the location of the virtual image, no image would be observed by the eye. An example of a virtual image is the image of fine print viewed through a magnifying glass. The print not only appears larger, it also appears to be located substantially behind the surface where the print actually exists. By definition, a virtual image can exist at a location where no display surface exists. The size of the virtual image therefore is not limited by the size of a display surface. Virtual image displays thus have the advantage of eliminating the need for a large display surface in order to provide a large image to the viewer.

A virtual image display must initially form a source object that is then imaged by an optical system to create the virtual image. A substantial advantage of a virtual image electronic display is that the source object initially created may be as small as can be usefully reimaged by the optical system. As a result, virtual image electronic displays may effectively utilize very small displays to form the source object. Pixel sizes may be as small as a few microns in diameter. At this size, the unaided eye cannot resolve images. Rather, in order to view the source object formed by the display, substantial magnification of the optical system is required.

A virtual image must be created by an optical system of some kind. In a real image electronic display, it is the eye and the viewing surface properties that determine the viewing parameters. By contrast, in a virtual image display, the optical system determines most of the viewing parameters.

There are three important parameters relating to the ease of viewing the image associated with virtual image displays. The first parameter is the far point. This refers to the maximum distance from the eye which the optical system can be held and have the eye still see the entire virtual image. Optical devices which provide a far point which is a short distance from the optic are undesirable due to the inconvenience and discomfort associated with placing the eye in close proximity with the optic. It is therefore preferred that an optic provide a long far point in order to enable the magnified image to be viewed through the optic at a comfortable and convenient range of distances from the optic.

The second parameter relating to the ease of viewing a virtual image is the apparent angular width of the virtual image, commonly referred to as the field of view of the virtual image. The full field of view is defined as the ratio of the largest apparent dimension of the virtual image to the apparent distance to the virtual image. It is generally equivalent to the field of view for a real image display surface.

The third parameter relating to the ease of viewing a virtual image is the transverse distance that the eye may move with respect to the optical system and still have the eye see the entire virtual image through the optical system. This is commonly referred to as the "eyebox."

A need currently exists for an inexpensive, compact virtual image display for a head mounted apparatus that is positionable within a small volume, that provides the observer with a large field of view, a virtual image with a significant degree of eye relief and a large translational distance.

It is recognized that one of the primary factors driving up the cost of head mounted displays is the cost of the initial display. Prior art head mounted displays have been created that use smaller displays coupled to magnification systems. These generate the larger virtual images the viewer sees. However, prior art magnification processes are bulky and can make head mounted displays unwieldy and cumbersome.

Therefore, the need exists for a lightweight head mounted display that operably presents a visual display occupying all or almost all of the viewer's field of vision to a wearer that is both comfortable and relatively inexpensive.

Further, video images are recorded with various aspect ratios, e.g., 4:3 and 16:9. The display screen showing the unmagnified video image will necessarily have fixed dimensions. Therefore, for all images with aspect ratios that do not match the fixed dimensions of the display screen, there will be distortion in either the height or the width of the image dependent upon the relation between the aspect ratio of the image and that of the display. It would be an improvement if the image could be adjusted so that it appears undistorted to a viewer.

SUMMARY OF THE INVENTION

An object of the invention is to create a head-mounted display that is comfortable, lightweight, and relatively inexpensive.

Another object of the invention is to create a head-mounted display with a lens that is adjustable so that regardless of the aspect ratio of the initial image, the image that is ultimately presented to the viewer fills the viewer's field of vision.

This and other objects of the invention are accomplished by a head mounted display having a two-stage optical system where the second stage magnification is accomplished using total internal reflection techniques. This two-stage system is usable in a relatively compact and inexpensive head mounted display. In a preferred embodiment, the head-mounted display has two sections extending rearward around the sides of the head. Within each section, a display screen projects an image that passes through a first lens that adjusts the size of the image. It can magnify the image, alter the aspect ratio of the image, or both. The image then undergoes total internal reflection within a subsequent lens, resulting in magnification of the image. The viewer is presented with a virtual image many times larger than the original display.

DETAILED DESCRIPTION OF THE PREFERRED EMBODIMENT

Figure 1:
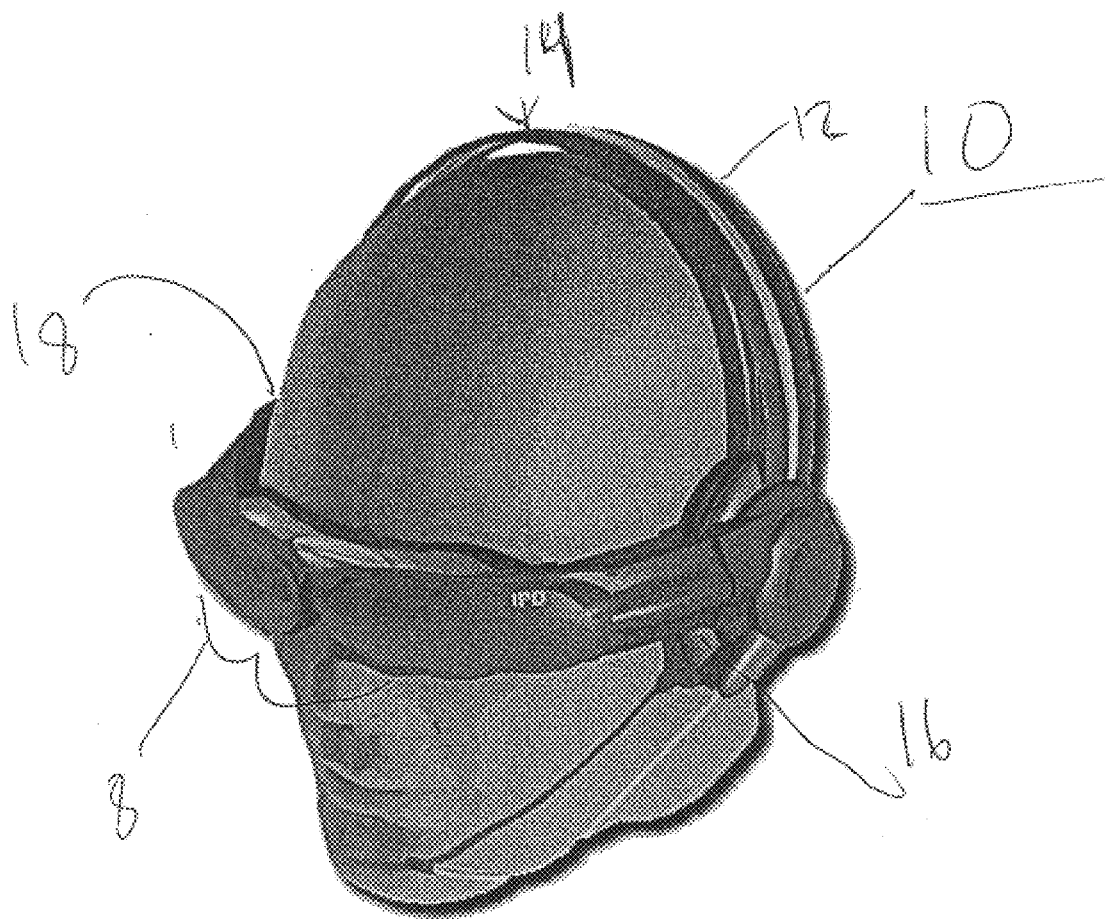
FIG. 1 is an illustration of the preferred embodiment for the head mounted display.

FIG. 1 shows the head-mounted display of the present invention. The head mounted display 10 includes rigid shell 12 having a support beam 14 and a pair of rigid arms 16, 18 extending from the support beam, wherein a visor 8 is pivotally attached to the support beam.

Preferably, the shell 12 is of a one-piece construction of a plastic such as ABS or molded polymer. It is understood the shell 12 may be manufactured as a number of individual component parts that are assembled or bonded to form a substantially rigid one-piece unit.

Figure 2:
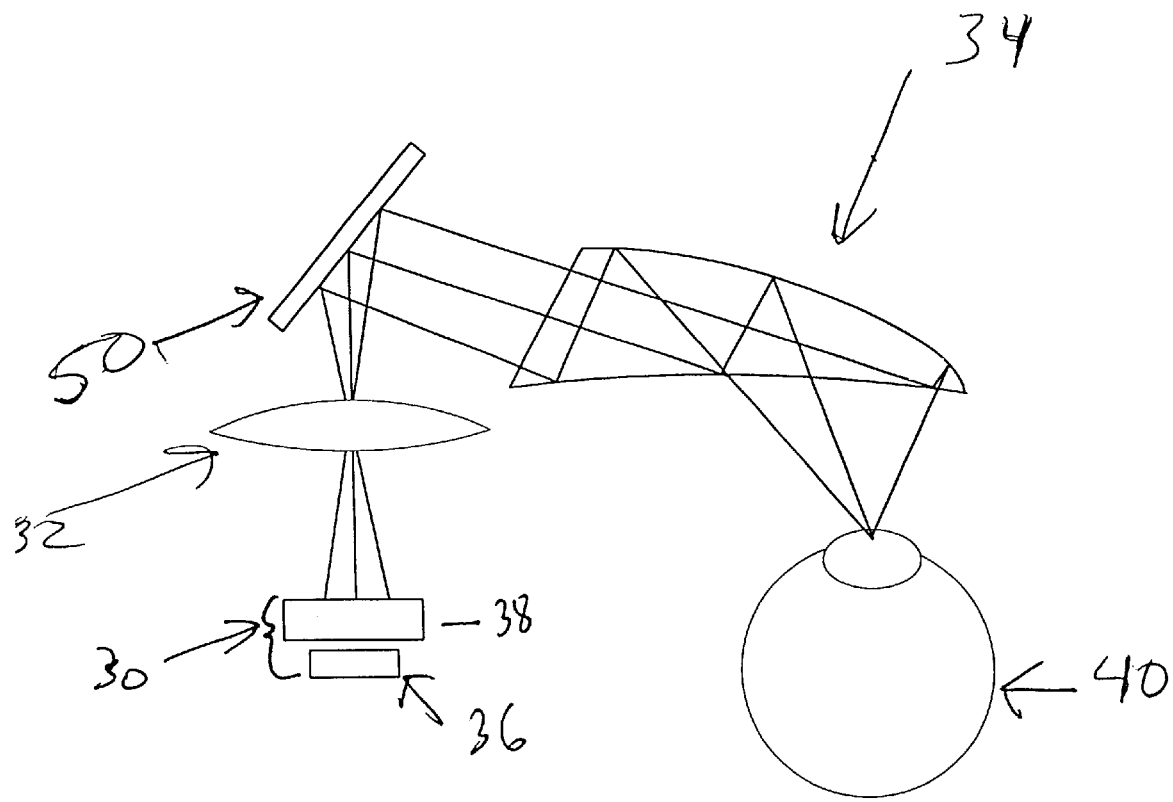
FIG. 2 is a schematic illustration of the two-stage process.

FIG. 2 is an illustration of the magnification process used for this invention. It includes a display 30, a first magnifier 32 and a totally internally reflecting (TIR) lens 34. Rays from a generated image can be seen traveling through the system and ultimately being received by a viewer's eyeball 40.

Figure 3:
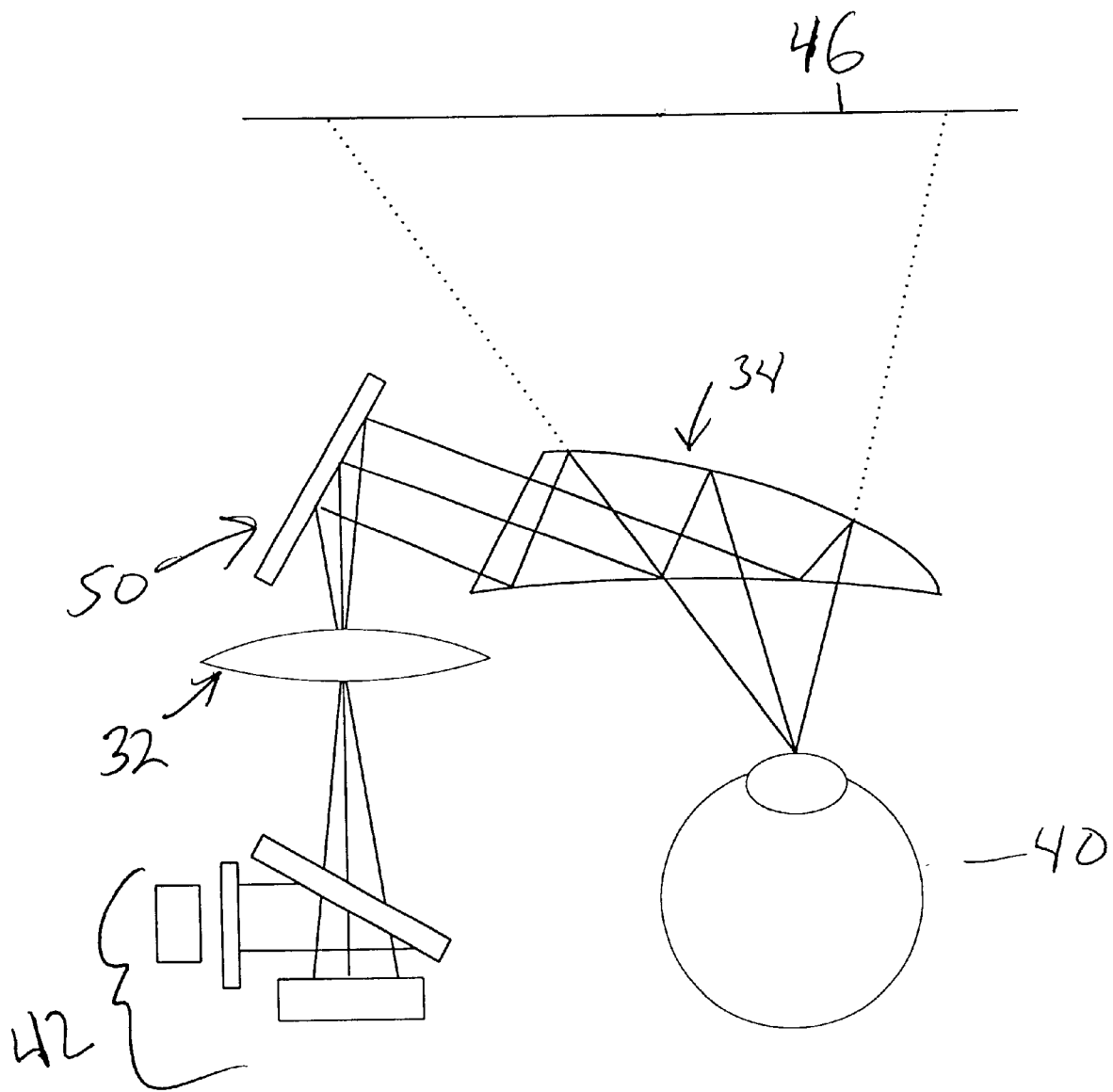
FIG. 3 is a schematic illustration of the two-stage process where the display is reflective.

The image to be magnified originates on the display screen 30, which will generally have a screen size of 0.5" diagonally. As technology improves these smaller screen displays may be used with this invention. Displays with 0.5" diagonals are much cheaper than 1" or 2" displays. The display will be one of three kinds: (1) self-illuminating or emissive, e.g., an OLED or FED, (2) back lit or transmissive, e.g., an AMLCD, or (3) front lit or reflective, e.g., a LCOS. The screen used in our preferred embodiment is a transmissive display. A first stage optical system 32 is placed in the path of the light being projected from the display. We have primarily used transmissive displays such as that illustrated in FIG. 2. Light source 36 illuminates the screen 38. FIG. 3 illustrates the magnification system where a reflective display 42 is used.

The first stage magnification process is an optical system designed to simply enlarge the image. The first stage magnification process may take the form of a single lens such as a simple aspherical convex lens or it could take the form of a series of lenses. For the sake of simplicity, the first stage magnification optic will be referred to as an effective lens 32. It will be understood that effective lens refers to the one or more lenses constituting the first stage. The effective lens 32 projects a magnified, collimated real image onward to the second stage. The effective lens enlarges the projection enough so that when the beam passed through the TIR lens it fills the viewer's field of vision. Light also leaves the first stage at a predetermined angle chosen so that the beam will undergo total internal reflection before leaving the TIR lens 34.

In addition to magnifying the image, the effective lens 32 may also alter or correct the aspect ratio of the display. A lens or multiple lenses can be designed so as to alter the size of the image in the vertical and horizontal directions by different amounts. For instance, a 16:9 (width by height) image could be displayed on a 4:3 screen so that it fills the entire screen. This would cause the image on the screen to appear stretched and distorted. To eliminate that distortion the effective lens may be used to increase the width of the image, decrease the height of the image, or increase both in such a manner that the width is increased by more than the height. This would allow for the use of all the pixel elements, eliminating the letterbox effect and having a higher resolution image.

A mirror 50 is positioned between the first stage and the second stage of the magnification process. The image projected from the first stage magnification process is reflected by the mirror into the TIR lens 34. This kind of mirror is known as a folding mirror. The mirror may also have some corrective features because it is unlikely that the TIR lens will be flawless. The mirror can be designed to compensate for these flaws.

Figure 5:
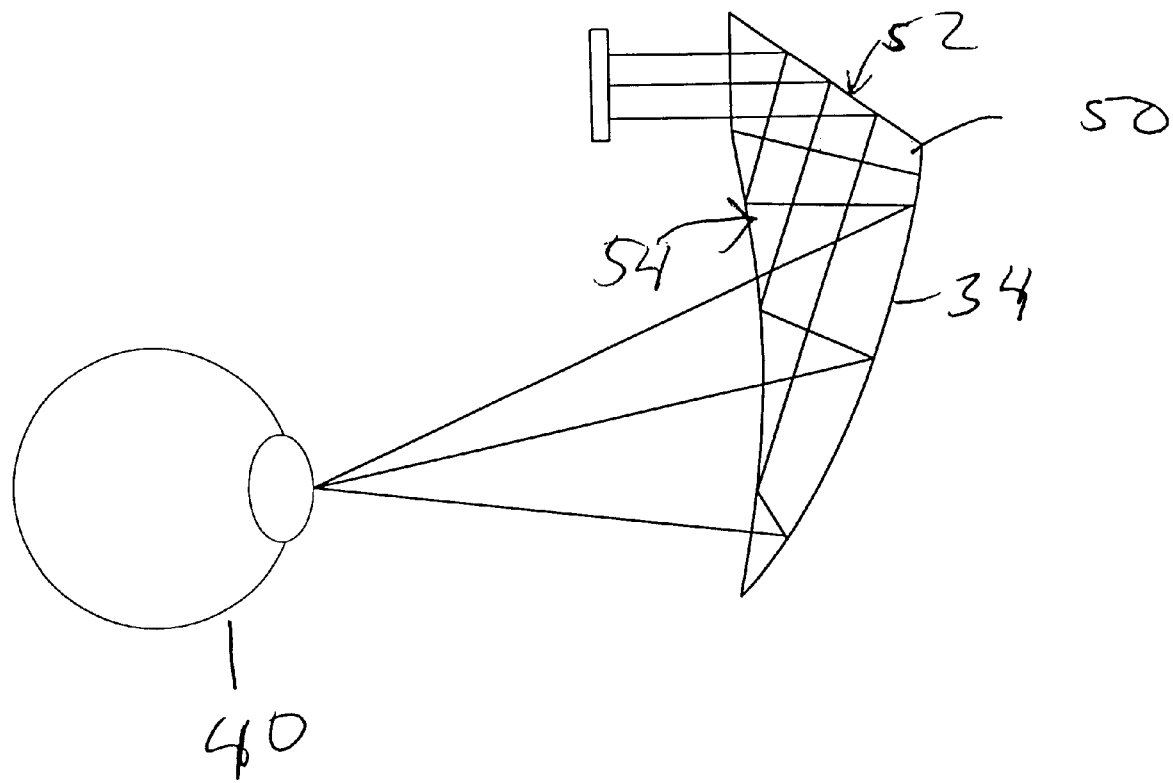
FIG. 5 is a schematic illustration of a TIR lens incorporating a folding mirror integrally along the leading edge.

The mirror 50 may also be integral with the TIR lens 34. See FIG. 5. Incoming images pass through the base normal to the surface, so as to eliminate reflection. The mirror lies along surface 52 of the TIR lens and reflects the light onto surface 54 of the lens.

Figure 4:
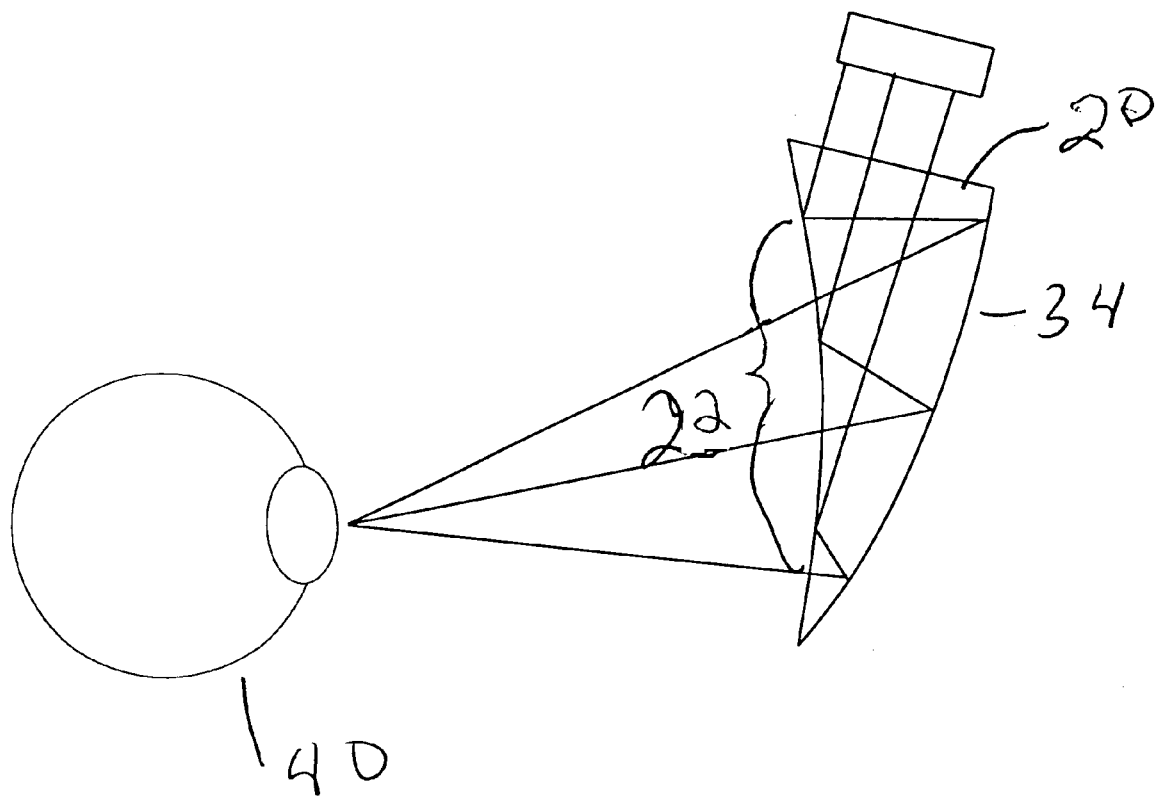
FIG. 4 is an illustration of the lens used for total internal reflection.

The TIR lens 34 is shown in FIG. 4. In general, the TIR lens is composed of a dielectric having a higher index of refraction than air. It has a small diameter inlet port 20, and a large diameter exit port 22. The inlet port 20 is located in front of the beam leaving the first stage lens. The large diameter exit port 22 faces towards a downstream viewing area. The TIR is defined by two curved walls, the walls having different radii of curvature.

Figure 7A:
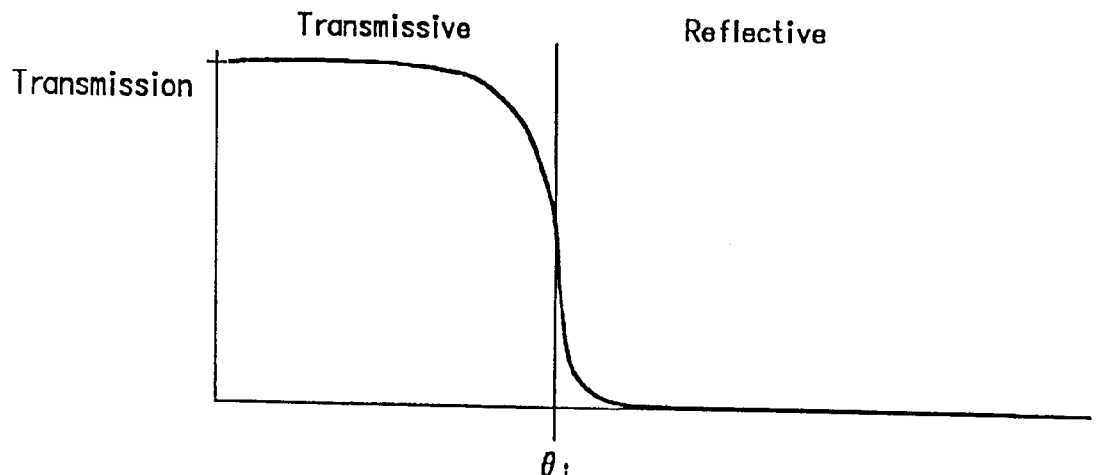
FIG. 7A shows a plot of transmission as a function of the angle of incidence for light passing from air into a TIR lens.
Figure 7B:
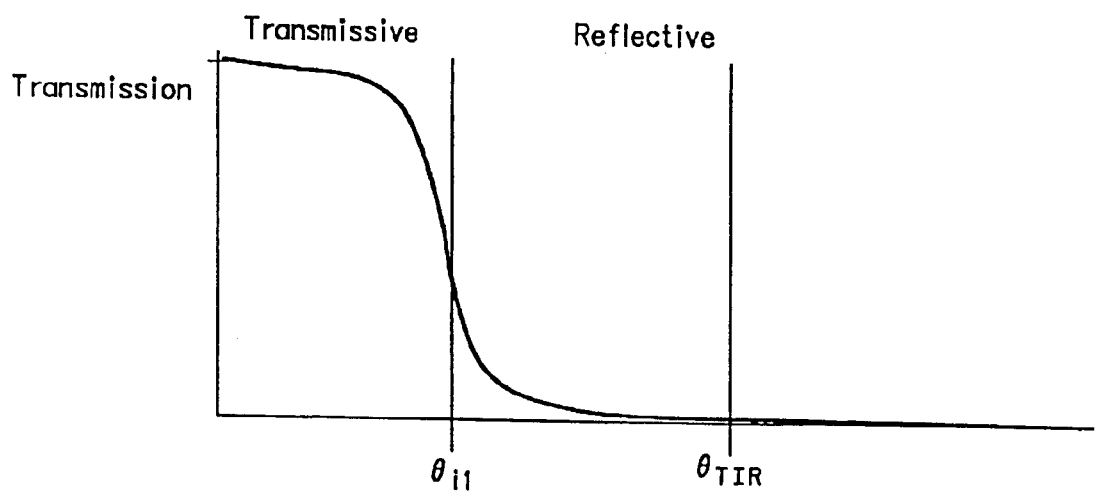
FIG. 7B shows a plot of transmission as a function of the angle of incidence for light passing from a TIR lens into air.
Figure 1:
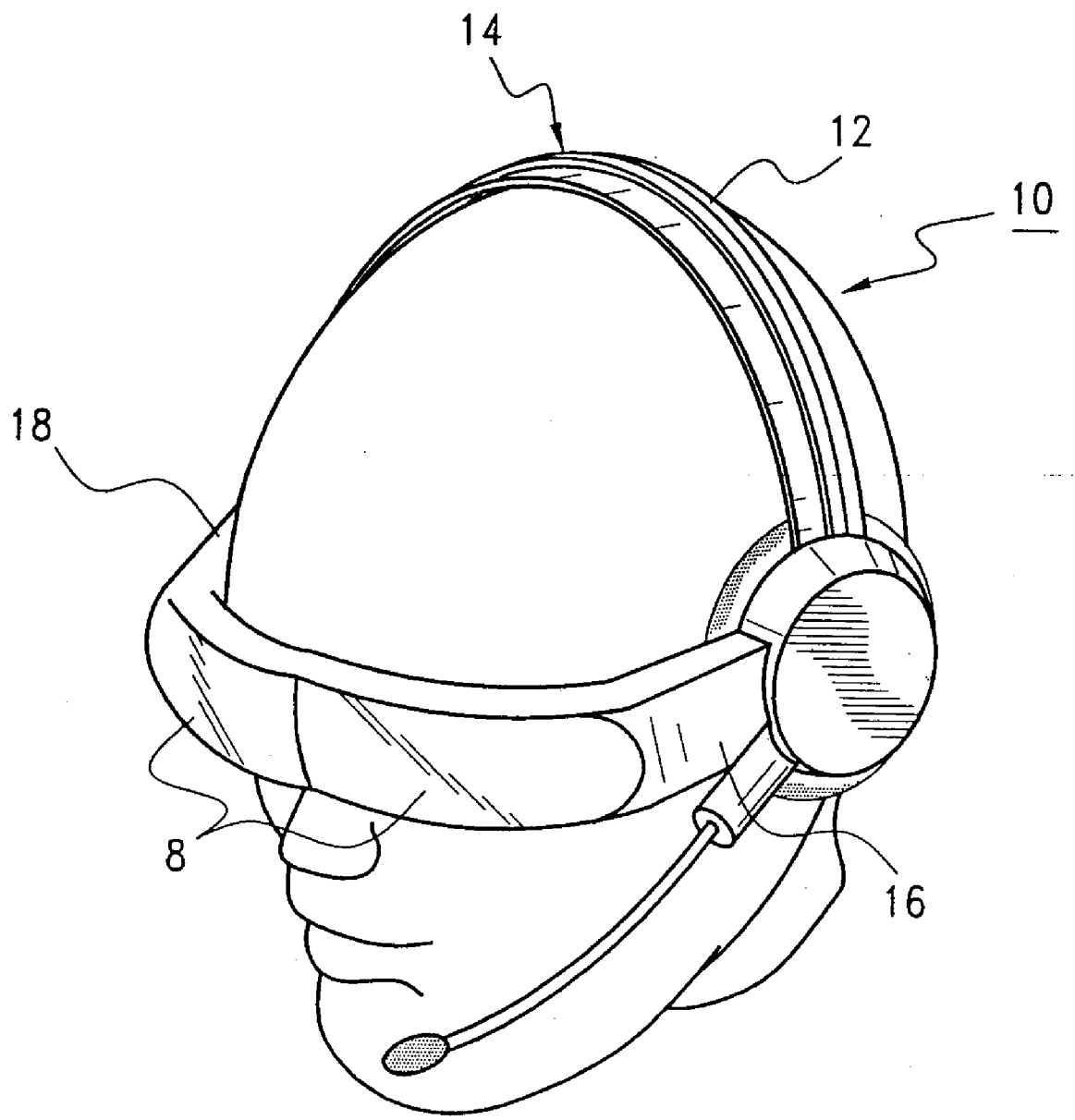
Figure 2:
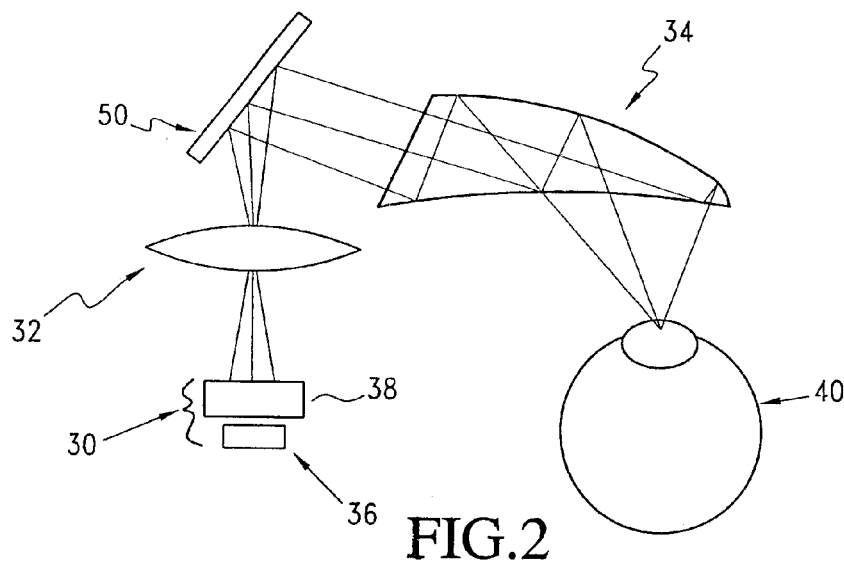
Figure 3:
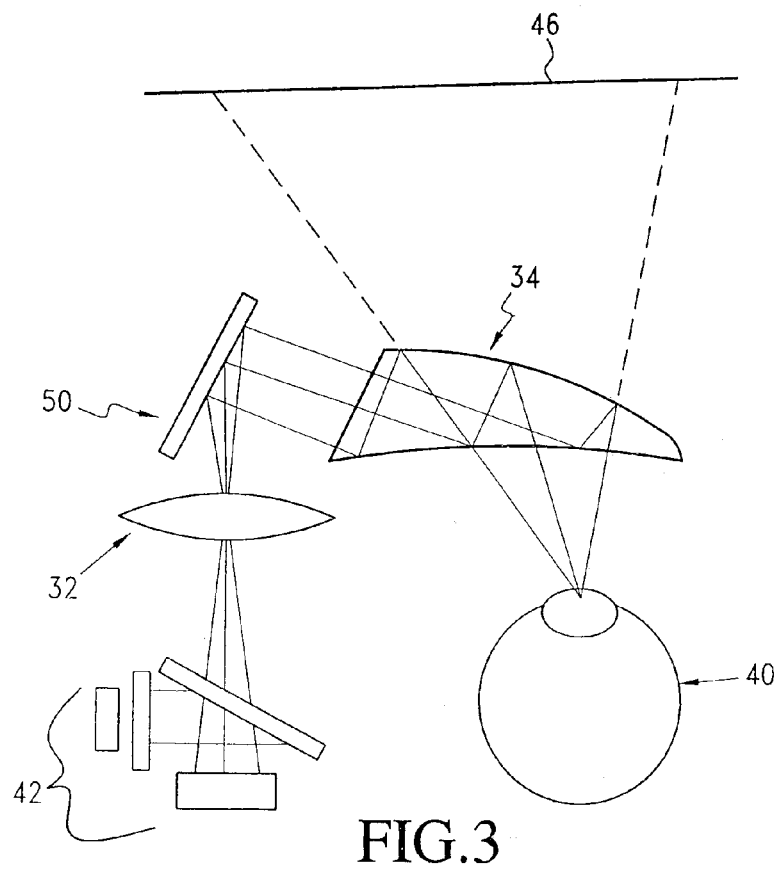
Figure 4:
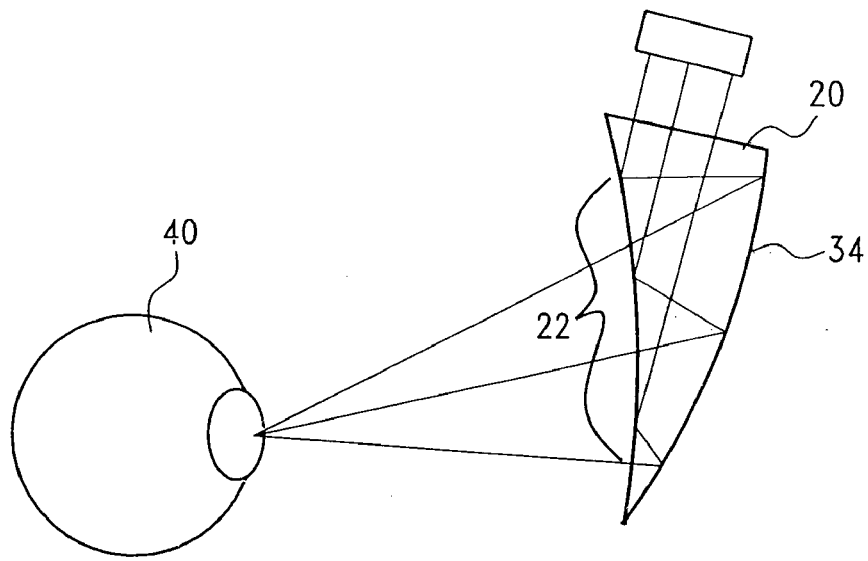
Figure 5:
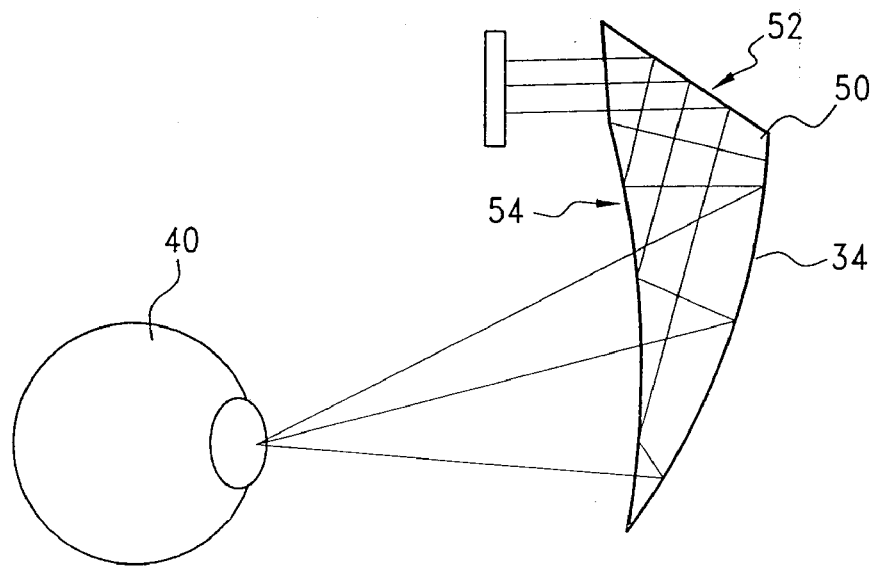
Figure 6:
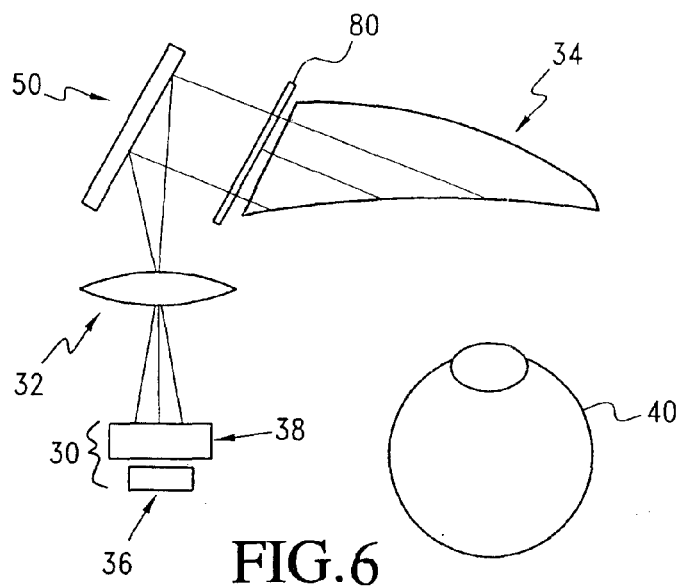
Figure 7A:
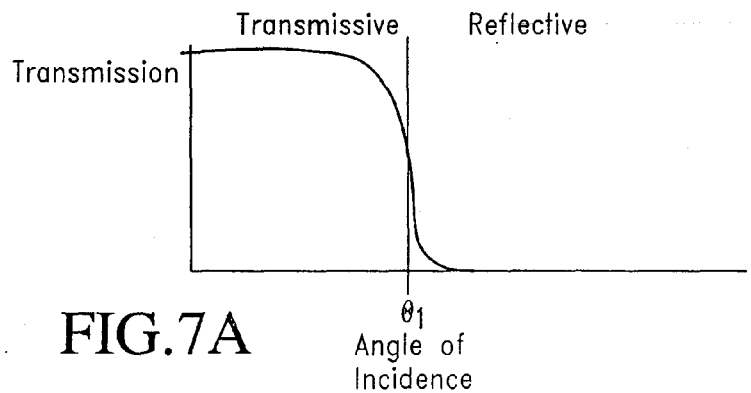
Figure 7B:
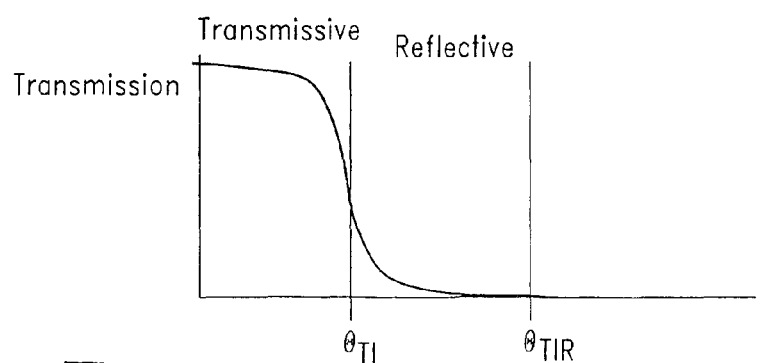

A TIR lens has the property that the inner surface is reflective to light above a certain angle of incidence, $\theta^i$, and transmissive below $\theta^i$. FIG. 7A shows a plot of transmission as a function of the angle of incidence for light passing from air into the TIR lens. FIG. 7B shows transmission as a function of the angle of incidence for light passing from within the first magnification optic into air. In FIG. 7B, the angle at which total internal reflection occurs is shown for angles greater than the angle of total internal reflection, $\theta_{TIR}$. The angle of total internal reflection for a material can be calculated using the formula $\theta_{TIR}=\sin^{-1}(1/n)$, where n is the index of refraction of the material. The angle corresponding to $\theta_i$ on FIG. 7A and $\theta_{ii}$ on FIG. 7B can be calculated using Snell's Law. The relationship is $\sin(\theta_i)=n*\sin(\theta_{ii})$, where n is the index of refraction of the material forming the compound optical element. As a result, light forming the magnified virtual image projected toward the inner surface at an angle ($\theta_{MVI}$) that is smaller than $\theta_{ii}$ is transmitted by the surface, while light from a source object projected toward the inner surface at an angle ($\theta_{so}$) that is greater than $\theta_{ii}$ is reflected back internally. This increases the distance light travels within the lens and increases the amount of refraction light rays undergo before exiting.

Because of the curvature of the walls of the TIR lens, and because different elements of the projected image are spread out over a finite distance, the different elements of the display image follow diverging paths and spread apart as they pass through the TIR lens. Because of this divergence, when the beams exit the TIR lens and travel onward towards the viewer's eyes, the viewer perceives a much larger virtual image. The exact magnification depends upon the exact shape of the lens and the angle of penetration of the beam from the first stage lens. The magnification process is illustrated best in FIG. 3 by the increased spacing between the light rays exiting the exit port. Spatial plane 46 is where the viewer perceives the image to be. The angular spread of the light striking the viewer's eyeball 40 is what causes the viewer to perceive the larger more distant figure.

The relative distances separating the display, the first lens, and the TIR lens 34, depends upon the initial display size, the amount of magnification desired, the aspect ratio of the image, the relative dimensions of the display screen, the size and shape of the first lens, and the size and shape of the TIR lens.

A preferred embodiment of this invention combines this apparatus into the head-mounted display 10 of FIG. 1. Each arm 16, 18 of the head mounted display extending rearward from the viewer's face contains, from rear to front, a display, a first stage optical system, a folding mirror, and a lens capable of total internal reflection.

Figure 6:
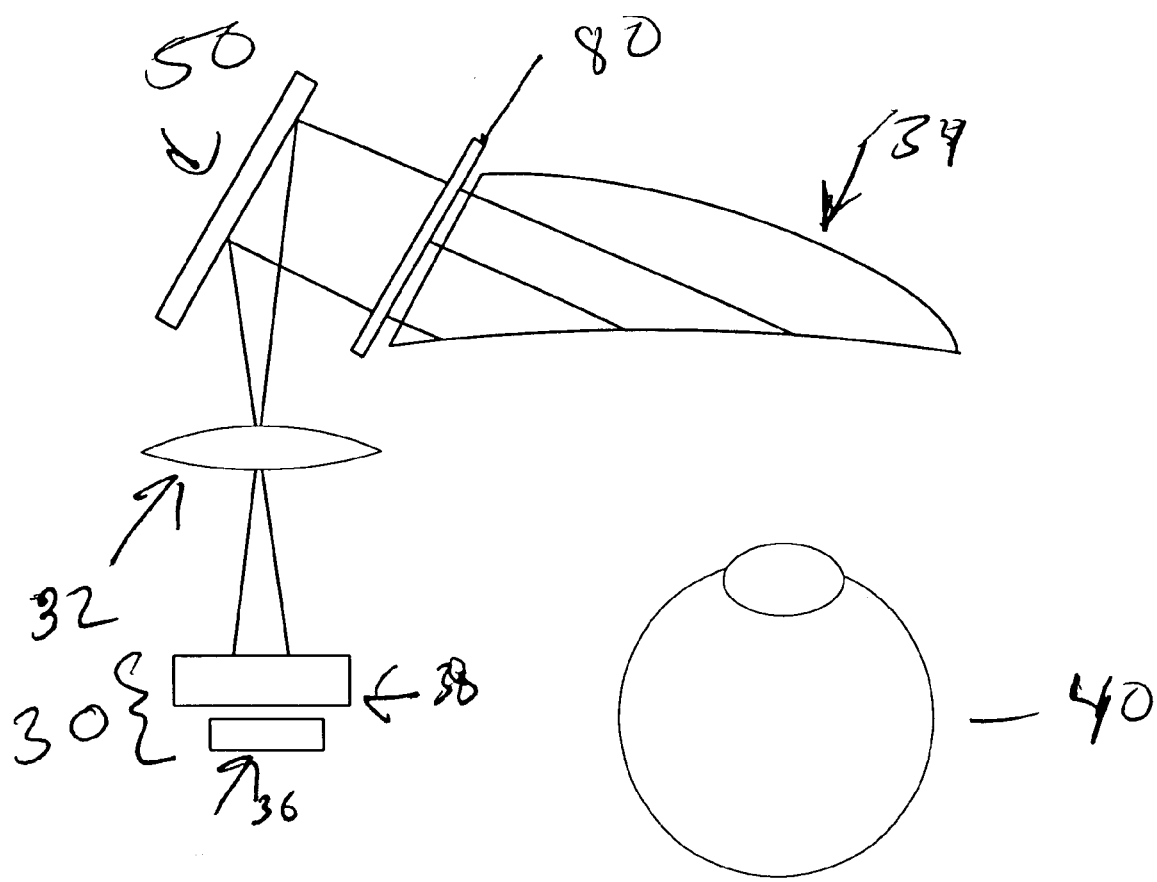
FIG. 6 is an illustration of another embodiment of the two-stage process using a projection element between the first and second stages of the process.

FIG. 6 illustrates another embodiment of the two stage optical system. In this embodiment a diffuser has been located in front of the TIR lens. This is sometimes necessary because the incident image will often be highly collimated after passing through the first stage magnification process. When a ray of light impinges on a diffuser, it emits a cone of rays corresponding to the incoming ray. The size of this cone is determined by the characteristics of that particular diffuser. After passing through the diffuser, the viewer ends up receiving the image from multiple angles. This increases the size of the viewer's eyebox.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

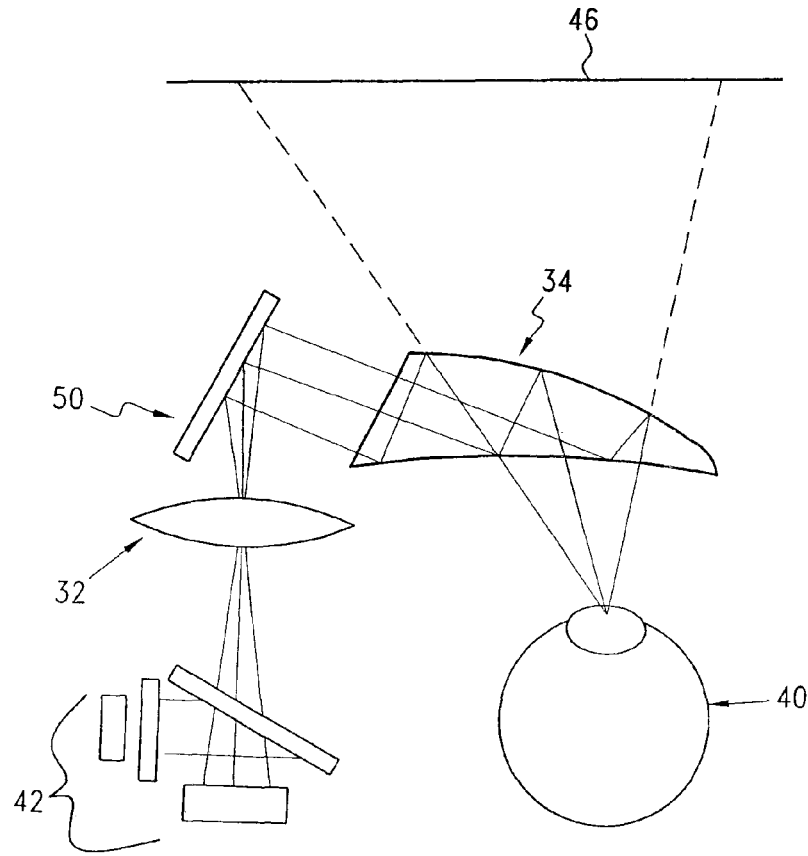

What is claimed is:

1. A two-stage display system for a head mounted display, comprising:
    (a) a display;
    (b) a first magnification optical system including a first lens optically connected to the display; and
    (c) a second magnification optical system optically connected to the first magnification optical system, where the second system includes a second lens in which at least a portion of the incoming light is totally internally reflected.

2. The display system of claim 1, wherein the display is one of a self-illuminating display, a back lit display, and a front lit display.

3. The display system of claim 1, where the first lens comprises a double convex lens.

4. The display system of claim 1, where the first lens comprises an aspherical lens.

5. The display system of claim 1, where the first comprises a compound lens.

6. The display system of claim 1, where the first lens comprises multiple lenses.

7. The display system of claim 1, where the display is less than 1.0'.

8. The display system of claim 1, where the display is less than 0.7'.

9. The display system of claim 1, where the display is less than 0.5'.

10. A two-stage display system for a head mounted display comprising a display;
    a first magnification optical system to magnify a display image;
    a mirror optically connected to the first magnification optical system to reflect the magnified display image; and
    a second magnification optical systems optically connected to the . mirror, the second system including a lens in which at least a portion of the incoming light is totally internally reflected.

11. The display system of claim 10, where the mirror is attached to the lens.

12. The display system of claim 1, further comprising a diffuser connected to the first and second optical systems to create a large eyebox for the viewer.

13. A head mounted display system, where the image is initially projected from the sides of a viewer's head, comprising:
    (a) a first display screen positioned on a first side of the viewer's head so that when the head mounted display is in place on the viewer's head, a perpendicular to the first display screen's face is substantially parallel to the viewer's line of sight;
    (b) a first image magnifier comprising a first lens, optically connected to the first display screen;
    (c) a first mirror optically connected to the first image magnifier to fold the light around the head;
    (d) a second image magnifier including a second lens in which at least a portion of the incoming light is totally internally reflected, optically connected to the first mirror;
    where the first image magnifier and first mirror are shaped and positioned so that light entering the second lens from the first mirror is internally reflected at least one time; and
    the output of the second lens is optically connected to a user's eyeball causing the viewer to perceive a virtual image in space.

14. The display system of claim 13, further comprising:
    (a) a second display screen positioned on a side of the viewer's head opposite the first side, and positioned so that when the head mounted display is in place on the viewer's head and the viewer is looking forward, a perpendicular to the first display screen's face is substantially parallel to the viewer's line of sight;
    (b) a third image magnifier comprising a third lens, optically connected to the second display screen;
    (c) a second mirror optically connected to the third image magnifier to fold the light around the head;
    (d) a fourth image magnifier including a fourth lens in which at least a portion of the incoming light is totally internally reflected, optically connected to the second mirror; where the third image magnifier and second mirror are shaped and positioned so that light entering the fourth lens from the second mirror is internally reflected at least one time; and the output of the fourth lens is optically connected to a user's remaining eyeball causing the viewer to perceive a virtual image in space.

15. The head mounted display of claim 14, where the first and second display screens illustrate views from different angles so as to generate a three-dimensional image.

* * * * *

UNITED STATES PATENT AND TRADEMARK OFFICE
CERTIFICATE OF CORRECTION

PATENT NO. : 6,417,970 B1
DATED : July 9, 2002
INVENTOR(S) : Paul Travers and Paul Churnetski It is certified that error appears in the above-identified patent and that said Letters Patent is hereby corrected as shown below:

The title page, showing an illustrative figure, should be deleted and substitute therefor the attached title page.

Title page,
Item [75], Inventors, "Honeoya Falls" should read -- Honeoye Falls --; and "Paul Chumetski" should read -- Paul Churnetski --.

Delete Drawing Sheets 1-7, consisting of Figs. 1-7B, and substitute therefor the Drawing Sheets 1-4, consisting of Figs. 1-7B, as shown on the attached pages.

Signed and Sealed this

Thirteenth Day of July, 2004

JON W. DUDAS
*Acting Director of the United States Patent and Trademark Office*

(12) United States Patent
Travers et al.

(10) Patent No.: US 6,417,970 B1
(45) Date of Patent: Jul. 9, 2002

(54) TWO STAGE OPTICAL SYSTEM FOR HEAD MOUNTED DISPLAY

(75) Inventors: Paul Travers, Honeoya Falls; Paul Chumetski, West Henrietta, both of NY (US)

(73) Assignee: Interactive Imaging Systems, Rochester, NY (US)

(*) Notice: Subject to any disclaimer, the term of this patent is extended or adjusted under 35 U.S.C. 154(b) by 0 days.

(21) Appl. No.: 09/589,836

(22) Filed: Jun. 8, 2000

(51) Int. Cl.$^7$ ................................................ G02B 27/14
(52) U.S. Cl. ........................................ 359/630; 359/631
(58) Field of Search .............................. 359/630, 631, 359/633, 637; 345/7–9

(56) References Cited

U.S. PATENT DOCUMENTS

| | | | |
|---|---|---|---|
| 3,941,467 A | * 3/1976 | Kapany et al. | 353/34 |
| 5,771,124 A | 6/1998 | Kintz et al. | 359/633 |
| 5,795,049 A | 8/1998 | Gleckman | 353/122 |
| 5,959,780 A | 9/1999 | Togino et al. | 359/630 |
| 5,991,084 A | 11/1999 | Hildebrand et al. | 359/629 |
| 6,005,720 A | 12/1999 | Watters et al. | 359/633 |
| 6,023,372 A | 2/2000 | Spitzer et al. | 359/630 |

* cited by examiner

Primary Examiner—Ricky Mack
(74) Attorney, Agent, or Firm—Stephen B. Salai, Esq.; Brian B. Shaw, Esq.; Harter, Secrest & Emery LLP

(57) ABSTRACT

A head-mounted display having a two-stage optical process is disclosed. This two-stage system enables a relatively compact and inexpensive head mounted display. The head-mounted display has two sections extending rearward around the sides of the head. Within each section, a display screen projects an image that passes through a first lens. It then undergoes a magnification process involving total internal reflection within a second lens. The light exiting the second lens is magnified to the level desired at a low cost and a small size.

15 Claims, 7 Drawing Sheets